United States Patent [19]

Gjessing et al.

[11] Patent Number: 4,829,306
[45] Date of Patent: May 9, 1989

[54] SYSTEM FOR DETECTION OF OBJECTS WITH GIVEN, KNOWN CHARACTERISTICS AGAINST A BACKGROUND

[75] Inventors: Dag K. T. Gjessing, Skedsmokorset; Jens F. Hjelmstad, Lillestrom, both of Norway

[73] Assignee: Norges Teknisk-Naturvitenskapelige Forskningsråd, Oslo, Norway

[21] Appl. No.: 101,357
[22] PCT Filed: Jan. 7, 1987
[86] PCT No.: PCT/NO86/00003
 § 371 Date: Aug. 31, 1987
 § 102(e) Date: Aug. 31, 1987
[87] PCT Pub. No.: WO87/04256
 PCT Pub. Date: Jul. 16, 1987
[51] Int. Cl.$^4$ ............................................. G01S 13/00
[52] U.S. Cl. .................................... 342/159; 342/189
[58] Field of Search ................ 342/25, 107, 112, 129, 342/146, 156, 192, 159, 175, 189; 367/88, 100

[56] References Cited

U.S. PATENT DOCUMENTS

| | | |
|---|---|---|
| 3,490,018 | 1/1970 | Botwin et al. . |
| 3,735,400 | 5/1973 | Sletten et al. . |
| 3,787,850 | 1/1974 | Sletten et al. . |
| 4,042,928 | 8/1977 | Altes . |
| 4,086,590 | 4/1978 | Goggins, Jr. . |
| 4,119,940 | 10/1978 | Keating et al. . |
| 4,216,537 | 8/1980 | Delignieres . |
| 4,321,601 | 3/1982 | Richman . |
| 4,403,311 | 9/1983 | Tournois . |
| 4,403,314 | 9/1983 | Tournois . |
| 4,458,342 | 7/1984 | Tournois . |
| 4,462,032 | 7/1984 | Martin . |
| 4,549,184 | 10/1985 | Boles et al. . |
| 4,596,007 | 6/1986 | Grall et al. . |
| 4,630,051 | 12/1986 | Adams et al. . |

FOREIGN PATENT DOCUMENTS

| | | |
|---|---|---|
| 53048 | 6/1982 | European Pat. Off. . |
| 0097490 | 1/1984 | European Pat. Off. . |
| 0100141 | 2/1984 | European Pat. Off. . |
| 155416 | 3/1981 | Norway . |

Primary Examiner—T. H. Tubbesing
Assistant Examiner—Mark Hellner
Attorney, Agent, or Firm—Wenderoth, Lind & Ponack

[57] ABSTRACT

The invention is primarily addressed to the problems relating to the detection and identification of vessels against the sea area. A radar sensor connected to powerful data processing equipment can give a monitoring capability having been impossible hitherto, by employing optimal radar structures and signal processing algorithms. There is described which functions which may be operated independently on the transmitter side and the receiver side. Depending upon the purpose such a radar may be applicable for: searching for vessels, searching for wake traces, simultaneously searching for vessels and accompanying wake traces, tracking vessels and wake traces, identifying vessels based upon various filters. As a consequence of the data control such a radar or possibly a corresponding sonar system may be able to reconfigurate as needed, which involves that the requirement for signal processing is reduced and the utilization of the resources improved. In order to form an interference pattern corresponding to the object or objects to be detected, transmitter means and/or receiver means in the system comprise two or more apertures (7A, 7B, 8A, 8B) for the coherent transmission and reception respectively of waves, the mutual distance between these apertures being larger than one wavelength of the waves transmitted.

15 Claims, 6 Drawing Sheets

SYSTEM FOR DETECTION OF OBJECTS WITH GIVEN, KNOWN CHARACTERISTICS AGAINST A BACKGROUND

BACKGROUND OF THE INVENTION

This invention relates to the detection of objects with given, known characteristics against a background. The problems associated with the detection and identification of for example vessels against the sea surface has interest in this connection. Primarily the invention has been developed for radar systems and the employment of electromagnetic waves, but obviously it may also be applied in sonar and the like which is based upon acoustic waves.

In radar systems which include powerful data processing equipment the invention can give a monitoring capability which has been quite impossible hitherto, by employing corresponding optimal radar structures and signal processing algorithms.

It is known in radar systems to transmit coherent electromagnetic waves having characteristics adapted to the object or objects, background wave pattern or other wave patterns to be brought forth, or possibly suppressed in the detection. Such adaption may be designated transmitter generated filter functions. The use of filter functions at the transmitter side involves that after an adapted detection at the receiver side there is obtained a decision as to whether an object corresponding to the filter function concerned, is present. The shape of the object in the space domain as well as its movements in the time domain are independent parameter sets which may be analysed. A hologram-like interference pattern of a wave or vessel structure or both is put on the sea surface by an outgoing wave and a reflective wave interfering and forming standing waves. Then the hologram or interference pattern can be swept so as to investigate which specific propagation directions or orientations in space are present. Because there exist relationships between for example the movement of vessels and associated water waves induced on and in the water, a wave hologram and a vessel hologram can be established on the sea surface simultaneously in order to enhance the detection process.

It is clear that what is an "object" and what is "background", is purely a question of definition. Thus, for example the object of interest may possibly be a "naturally" occuring water wave pattern, whereas vessels and accompanying wave patterns on the water surface may be regarded as an interfering background or noise, which the detection process attempts to suppress.

For a closer description of the more advanced radar systems of the recent time, being of interest in connection with the above and forming the background of this invention, reference may be made to the following:

1. Gjessing, D T, 1977, "A Generalized Method for Environmental Surveillance by Remote Sensing", Radio Science, Vol 13, No 2.
2. Gjessing, D T, 1978, "Remote Surveillance by Electromagnetic Waves for Air-Water-Land", Ann Arbor Publishers Inc, Ann Arbor, USA.
3. Gjessing, D T, 1981a, "Adaptive Radar in Remote Sensing", Ann Arbor Publishers Inc, Ann Arbor, USA.
4. Gjessing, D T, 1981b, "Adaptive Techniques for Radar Detection and Identification of Objects in an Ocean Environment", IEEE Journal of Ocean Engineering, OE-6.1, 5–17.
5. Gjessing, D T, 1979, "Environmental Remote Sensing. Part I: Methods Based on Scattering and Diffraction of Radio Waves", Phys Technol, Vol 10.
6. Gjessing, D T, Hjelmstad, J, Lund, T, 1982, "A Multifrequency Adaptive Radar for Detection and Identification of Objects. Results on Preliminary Experiments on Aircraft against a Sea Clutter Background", IEEE Transactions on Antennas and Propagation, AP-30, 3, 351–365.
7. Gjessing, D T, Hjelmstad, J, 1982, "Adaptive Radar in Remote Sensing Space, Frequency and Polarization Processes", Proc IEE Radar 82, London, October 1982.
8. Gjessing, D T, Hjelmstad, J, Lund, T, 1983, "Directional Ocean Spectra as Observed with a Multi-Frequency CW Doppler Radar System", Int J Remote Sensing 1984, 5, 2.
9. Bass, F B, Fuks, I M, 1979, "Wave Scattering from Statistically Rough Surfaces", Pergamon, N.Y.,
10. Dysthe, K, 1980, "Havbolger øg fysikk", Fra Fysikkens Verden.

SUMMARY OF THE INVENTION

In the typical case of an airborne radar system the invention—shortly expressed—is based upon the employment of antennas being separated in space in order to structure the hologram (the interference pattern) in the flight direction of the aircraft. This presumes that the main beam direction of the antennas is transversally to the flight direction and that the antennas have independent modulation. In a corresponding manner acoustic transducers will be provided in acoustic systems, for example sonar systems. Also systems operating within the optical part of the electromagnetic frequency range are possible within the scope of this invention.

Systems of the kind contemplated here comprise receiver means for receiving backscattered electromagnetic or acoustic waves respectively, and for coherent demodulation employing signal adapted filters, as indicated above. This signal processing at the receiver side may be designated receiver generated filter functions which on the basis of an assumed or given transmitter function, performs corresponding signal operations so as to obtain resolution in space and time resolution in the processing domain in which a maximum of contrast between object (target) and background is obtained.

On the above basis this invention provides a fundamental solution which opens up for many new and different possibilities and applications, and which is primarily characterized therein that the transmitter means and/or the receiver means comprises two or more apertures for coherent transmission and/or reception of the waves, and in that the mutual distance between the apertures is larger than one wavelength of the waves being transmitted.

Aircraft radar systems have been mentioned as an example above, but it will be realized that a system according to the invention may be employed on various types of carrying platforms, and not only on aircraft. Here both stationary as well as movable platforms may be contemplated. The two or more apertures may be located at one and the same platform or they may be arranged each on a separate platform which is mechanically independent of the one or more other platforms.

As will appear from the following there is also in other ways possibilities of various modifications of this new system, including the feeding of the apertures with the same or different frequencies, possibly time varying frequences, and variation in the mutual positions and orientations respectively, of the apertures.

Particularly preferred embodiments of this invention, inter alia at the points just mentioned, appear from the patent claims.

BRIEF DESCRIPTION OF THE DRAWINGS

In the following description the invention is to be explained more closely with reference to the drawings, in which.

DESCRIPTION OF THE PREFERRED EMBODIMENTS

Figure 1:
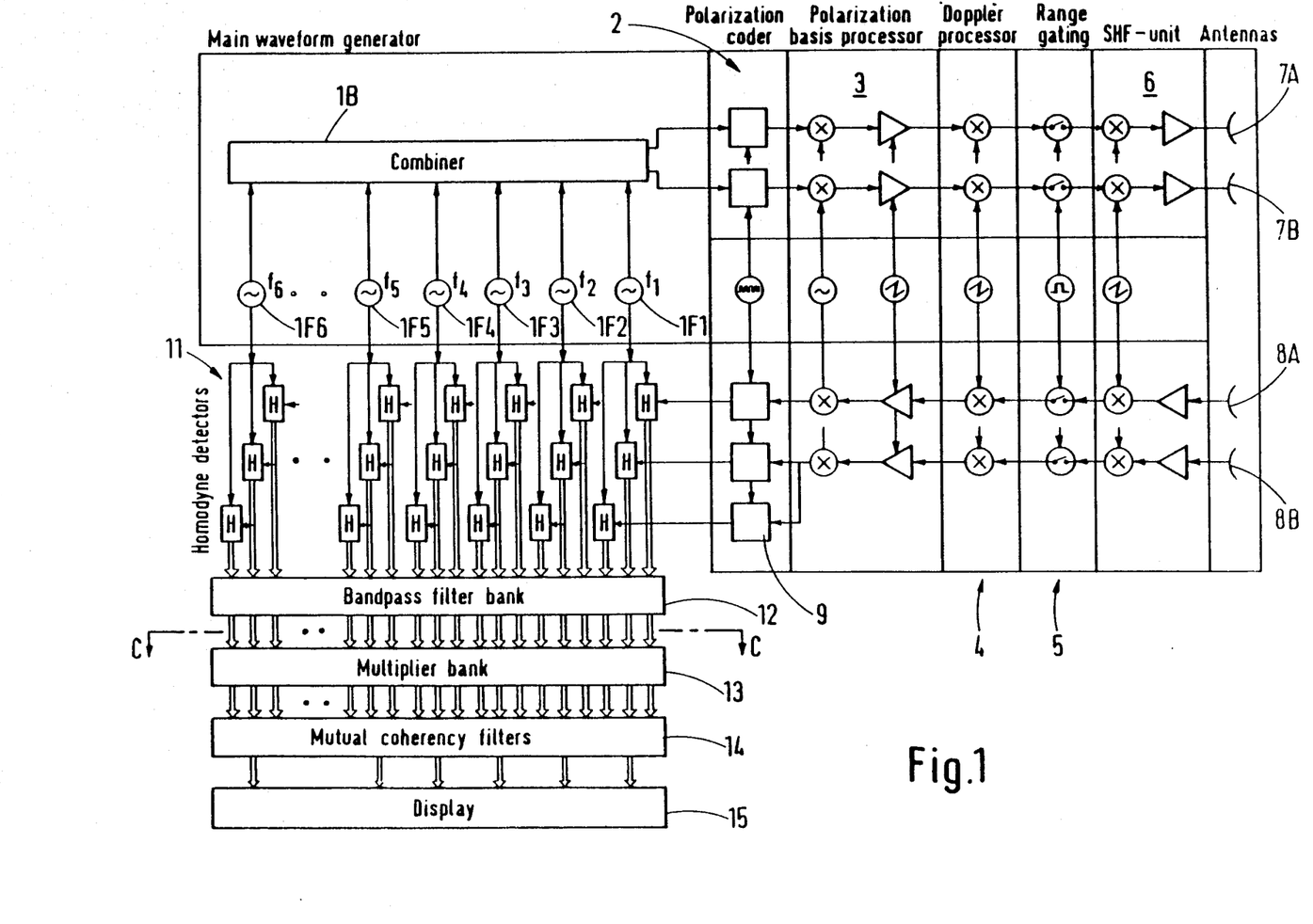
FIG. 1 shows a simplified block diagram of a radar system utilizing the principles according to this invention.

FIG. 1 is a simplified block diagram for illustrating a complete radar system in which the principles according to the present invention are employed. The radar of FIG. 1 is structured in blocks which are all controlled by a computer (not shown). For the various tasks or functions to be attended to by the radar system during operation, for example searching, tracking, identification), the filters or signal processing blocks of the radar will be configurated correspondingly and for the purpose of obtaining an optimal result. The filter or signal processing functions involved may be implemented to a substantial degree in the form of software for the computer. Algorithms for reconfiguring the radar system for the different tasks may also suitably be a part of this software. Line C—C in the figure indicates at which level it may be normally assumed that the software part (below the line) starts in relation to more or less conventional electronic circuits (above line C—C) being included in the system. It is obvious however, that this dividing line is not fixed and may be displaced towards more hardwired electronics or towards a greater proportion of software and computer processing, depending upon available technology. In view of present technology computer processing may as a maximum take place starting with the band pass filtering and proceeding downwards in FIG. 1.

The transmitter part of the system in FIG. 1 comprises in the first instance a group of frequency synthesizers 1F1–1F6 operating in the frequency band 50 to 90 MHz for the purpose of illuminating the object or area being of interest, with a suitable set of frequencies (waves). Thus in the example shown there are provided six frequency synthesizers 1F1–1F6 having selected mutual frequency spacings.

Among relevant transmitter generated filter functions in this system multi frequency illumination is mentioned at the first hand, i.e. the simultaneous transmission of several coherent waves or frequency components. For example by illuminating a seasurface from one or more transmitter apertures with a signal being composed of a number of frequency components, the combining of these at the receiver side will result in the generation of a number of standing waves against the seasurface. The period of these waves is inversely proportional to the frequency spacing between the frequency components. Several of the references mentioned above discuss more closely such transmitter generated filter functions, for example reference (6), page 356 and FIG. 4.

The transmitter frequencies mentioned consitute a coherent line spectrum of transmitted waves, which after having been combined in a combiner 1B, possibly may be given a polarization in a polarization coder 2 and a polarization basis processor 3. Then follows a Doppler processor 4 and a range-gating unit 5 before the signals proceed to a SHF-unit 6 which transposes the signals to a suitable microwave frequency. The purpose of the polarization processor 3 is to establish a plurality of channels for independent measurements of all elements in the backscattering matrix. The Doppler processor 4 performs a precompensation for the velocity of the object or target. The units or function blocks 2, 3 and 4 as mentioned here are not necessary for the solution principle according to the invention, but may make possible particular and advantageous functions in association therewith. It will be understood that corresponding functions may also be included at the receiver side, as shown in FIG. 1.

The example of FIG. 1 thus shows a structure having two transmitter channels which from the combiner 1B leads to two separate antennas or apertures 7A and 7B, the feeding of which gives a coherent transmission of electromagnetic waves. The mutual distance between the antennaes 7A and 7B must be larger than one wave length of the waves transmitted. This shall be explained more closely below with reference to FIGS. 3A and 3B.

Although FIG. 1 is a schematic and simplified drawing it will be realized that the antennas 7A and 7B emit directional radiation with parallel main beam directions for both antennas. In an advantageous embodiment these are moreover located in one and the same plane being normal to the main beam direction.

At the receiver side there are provided two antennas 8A and 8B with a mutual arrangement which may be quite similar to what is described with respect to the transmitter antennas. In two corresponding and separate receiver channels there may possibly be included functional blocks having functions being complementary to the blocks 2, 3 and 4 at the transmitter side. The polarization coder in the receiver part in addition to the through-going two receiver channels from the respective antennas 8A and 8B, comprises a specific unit which is necessary in order that the detection shall provide a complete measurement of polarization scatter values, which has no direct interest to the main idea according to the invention. The receiver part further comprises a number of homodyne detectors 11 which in a way known per se provides for the necessary detection. From the detectors there is delivered to a band pass filter bank 12 a number of signals corresponding to the six transmitted frequency components. Since the detection involves both amplitude and phase, the number of signals delivered by the band pass filters will be twelve.

The band pass filter function represented by block 12 in FIG. 1 as known and conventional is adapted to provide a narrow-band sensitivity within the respective frequency bands, so as to eliminate interference and noise. The following blocks 13 and 14 comprise more specific functions, namely a multiplication in 13 and a coherency filter function in 14. These shall be explained more closely below.

As the last (lowermost) functional block in FIG. 1 there is shown a display block 15. This serves to present the final product of the processing to the outside world, usually represented by an operator. In addition to or as an alternative to representation to an operator, the block 15 may of course comprise automatic alarm functions or control functions activated for example upon the detection and identification of a certain object.

Figure 2:
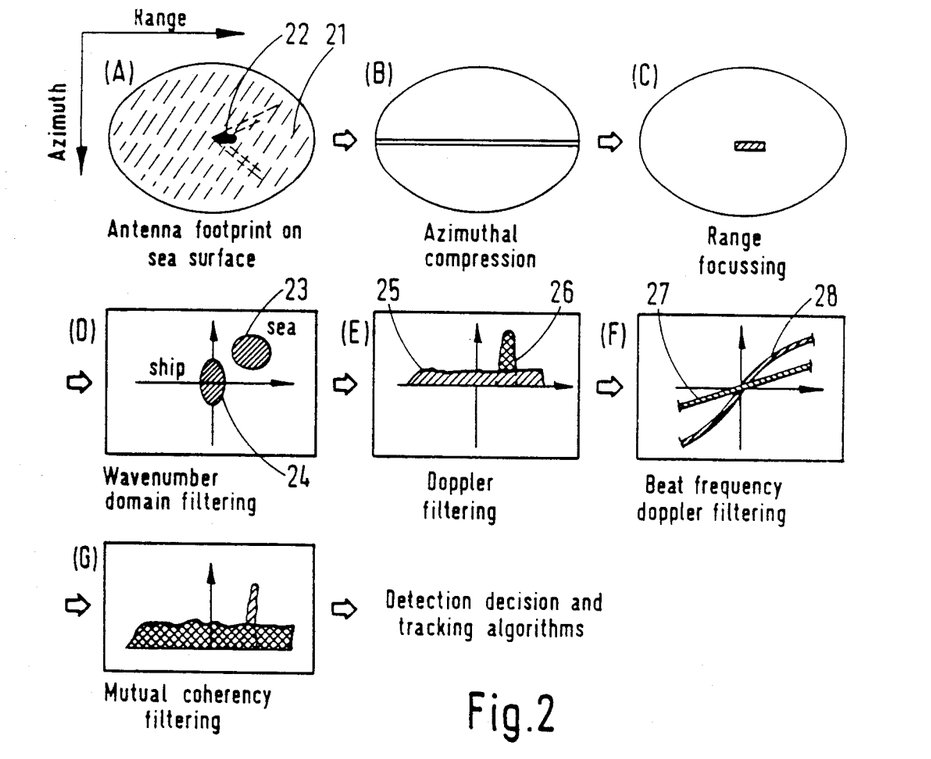
FIG. 2 illustrates receiver generated filter functions which may be involved in the system of FIG. 1.

Picture (frames) A–G in FIG. 2 illustrate functions which are included in or may be incorporated into the system of FIG. 1. Thus FIG. 2A shows a practical example of an application of a radar system, namely towards a seasurface having water waves 21 as indicated and with a vessel 22 in movement. The oval picture section shown may be regarded as the "scene" which is illuminated by the directional transmission of electromagnetic waves from a platform, for example an aircraft.

In FIGS. 2B and 2C there are illustrated an azimuthal compression and range gating or focusing functions respectively, not being directly related to the present invention, but indicating that the principles according to the invention may also be used in connection with conventional SAR-processing (SAR: synthetic aperture radar) and for special additional functions, such as range focusing. There is here the question of receiver generated filter functions being mainly based upon wave number filtering in order to obtain an enhanced spacial resolution.

Functions as illustrated by frame pictures 2D, 2E and 2F in the figure are related to wave number Doppler-filtering for establishing wave number spectra and associated Doppler-spectra. More specifically FIG. 2D shows in the principle a diagram of the socalled K-space signature for sea 23 and ship 24, which shall be explained more closely below with reference to FIG. 6. This form of presentation (in the K-space) is described in references (6), (7) and (8).

The multiplier block 13 in FIG. 1 in analog circuit technology and/or in a programmed computer attends to, inter alia, the wave number filtering which gives a presentation as in FIG. 2D.

By illuminating the sea surface from a transmitter aperture with a signal being composed of a number of frequency components, and by combining these at the receiver side there will be generated a number of standing waves against the sea surface with a period being inversely proportional to the frequency separation (distance) between the frequency components.

When the frequency separation between two frequency components is $\Delta F$ there will be a modulation in space with period $c/2\Delta F$. By transmitting a number of frequency components equal to n having differing mutual frequency separations, there is obtained by combination a number of $n(n-1)/2$ different modulation periods (wave number).

The transmitted signal s(t) will then be written as a sum of frequency components $$s(t) = \sum_{f_i}^{f_n} \exp(j2\pi f_i t) \cdot w(t)$$

in which
  w(t) = a suitable window function in the time domain in which space selective analysis of wave numbers is desired.

The above number $n(n-1)/2$ appears at the receiver side as a number of signals from block 13. Employing for example six transmitted frequency components this number of signals being processed is equal to 15.

FIGS. 2E, 2F and 2G relates to possible and desirable additional operations after the actual detection, namely Doppler-filtering (FIG. 2E) in which the ship is brought forth at 26 in relation to the sea 25, and beatfrequency-Doppler-filtering (FIG. 2F) in which the curve 27 (approximately rectilinear) is associated with the ship, whereas curve 28 relates to the sea. This latter form of diagram shall be explained more closely below with reference to FIG. 7. Finally FIG. 2G is concerned with the formation of mutual space/time coherency spectra by means of specific filter functions being represented by block 14 in FIG. 1. See also explanations below with reference to FIG. 8.

When applying filter functions which in a simplified and fundamental manner are illustrated in FIG. 2, the various characteristics of objects such as ships, induced waves and background waves, will be utilized for enhancing the detection capability of a radar system, possibly a sonar system or the like.

For the fundamental solution according to the invention there is a concept of substantial significance, which may be designated transverse space variable multi frequency illumination, i.e. the transmission of electromagnetic or acoustic waves towards a scene comprising an object and/or a background. In the example of airborne radar and by employing several antenna apertures along the flight direction of the aircraft, wave numbers may be assigned a component in the flight direction which may be utilized for generating periodic random orientation in relation to the flight direction of the aircraft and to the pointing direction of the antennae.

Figure 3A:
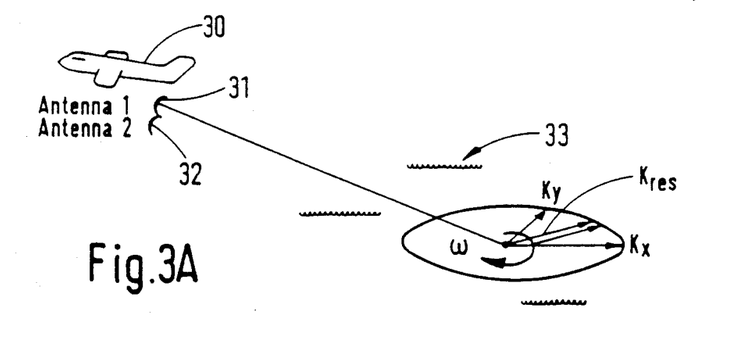
FIG. 3A shows a particular embodiment according to the invention.

By using a signal form $$s_1(t) = \sum_{f_i}^{f_n} \exp(j2\pi f_i t)\omega(t)$$

in aperture 1 and a signal form $$s_2(t) = \sum_{f_i}^{f_n} \exp(j2\pi(f_i + \delta f(t)t)\omega(t)$$

in aperture 2 separated by a distance x there is obtained a sweep of the wave number vector as illustrated in FIG. 3A. The above apertures 1 and 2 are represented in this figure by the two antennas 31 and 32 schematically indicated as belonging to an aircraft 30. The antennas illuminate an area of a seasurface 33 with an interference pattern which can vary with time, as will appear from the above mathematical expressions regarding signal forms $s_1(t)$ and $s_2(t)$.

The resulting spacial wave number vector $K_{res}$ may be given a rotation ($\omega$) in the horizontal plane by letting the transmitted signal at one of the antenna apertures 31, 32 have a differential frequency displacement (see the term $\delta f(t)$ in the expression for $s_2(t)$). This may vary with time. Moreover it will be understood that a randomly chosen phase difference between the apertures may be employed.

Considering that the resulting hologram or interference pattern which the antennas 31 and 32 establish in common, shall have desired or predetermined particular configurations which may deviate very significantly from what is established by the antennas individually, it will be necessary to locate the antennas at a mutual distance (x) which is larger than one wavelength of the frequencies employed.

Similar to FIG. 1 there is shown in FIG. 3A a location of the antennas 31 and 32 side by side in the same plane with parallel main beam directions in the same sense.

Figure 3B:
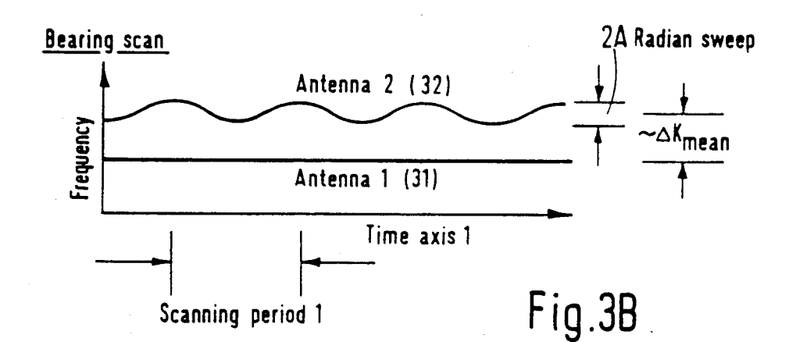
FIG. 3B shows a diagram related to the embodiment of FIG. 3A.

For a closer explanation of the operation according to FIG. 3A, there is shown in FIG. 3B how the frequencies being applied to the respective antennas 31 and 32 vary with time. While antennae 31 has a constant frequency, the antenna 32 has a periodic time variation as a sinus curve. The period is $(2\pi)/\omega$, wherein $\omega$ is the rotational velocity of the vector $K_{res}$ in FIG. 3A.

From the preceeding discussion of FIGS. 3A and 3B it appears that the system may operate with the same frequencies or with different frequencies and possibly with time varying frequencies at the two apertures. The choice of frequency variation and combination will depend upon which objects and/or backgrounds are of significance in a given practical use.

It will also be understood that the apertures must not necessarily lie in one and the same plane normally to the main beam direction or directions. The apertures may be arranged with a mutual displacement in the beam direction and in that way form interference patterns corresponding to that object or those objects which are to be detected, possibly to a background which shall be suppressed or emphasized. See FIG. 9.

Figure 4:
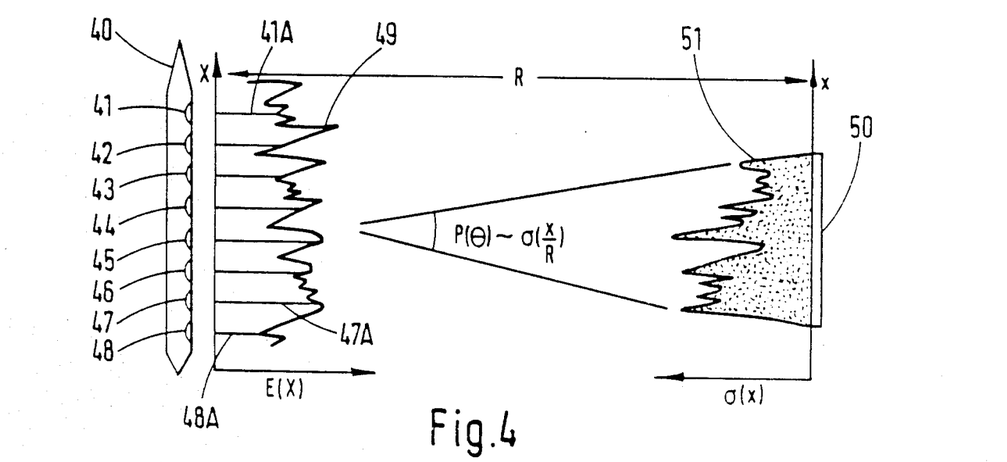
FIG. 4 illustrates the geometry of the scattering process in wave number filtering along the aircraft axis (direction of movement of the platform)

The geometry of the scattering process in wave number filtering along the aircraft axis is illustrated in FIG. 4. This shows a platform 40 provided with a number of transversally directed apertures 41–48 which illuminate an object 50 the reflection co-efficient of which varies according to curve 51 for the waves employed. Upon backscattering from the object there will appear at the receiver side a resulting field strength distribution as shown with curve 49. The apertures 41–49 or corresponding receiver apertures will then sense respective field strength values as shown at 41A–48A.

The angular spectrum $\vec{E_s(K)}$ of backscattered field strength 49 from the structure represented by the object 50, is the Fourier-transform of spacial field strength E(K) as seen in FIG. 4.

$$E(\vec{K}) \sim \int E(\vec{x}) e^{-j\vec{K}\cdot\vec{x}} d\vec{x}$$

in the same way the angular power spectrum $P(\theta)$ will be $$P(\theta) = E(\vec{K}) E^*(\vec{K})$$
$$\sim \int R_E(\vec{r}) e^{-j\vec{K}\cdot\vec{r}} d\vec{r}$$

in which
$R_E(\vec{r})$ = the autocorrelation function of the field strength interferogram $E(\vec{x})$ and $\vec{r}$ is an increment of $\vec{x}$. Since $$|\vec{K}| = \frac{4\pi}{\lambda} \sin \theta/2$$

and $$\vec{r} = \vec{V}\psi$$

whereby $\lambda$ = the microwave wavelength
$\vec{V}$ = the aircraft velocity (when the platform is an aircraft)
$\psi$ = time increment $K = \omega/c$ one has $$P(\theta) = \int R_E(V\psi) e^{-j\omega\psi \frac{V}{c}} d(V\psi)$$

which means $$P(\theta) \sim W(f) \sim \sigma\left(\frac{\psi}{R}\right)$$

This means that by taking the power spectrum of the interferogram (interference pattern, "hologram") through which the platform (aircraft) 40 moves, there is obtained a direct expression for the transverse distribution of scattering elements in the object structure 50.

The above references (1) and (2) treat the basic principles for what is discussed immediately above in connection with FIG. 4.

Figures 5A, 5B:
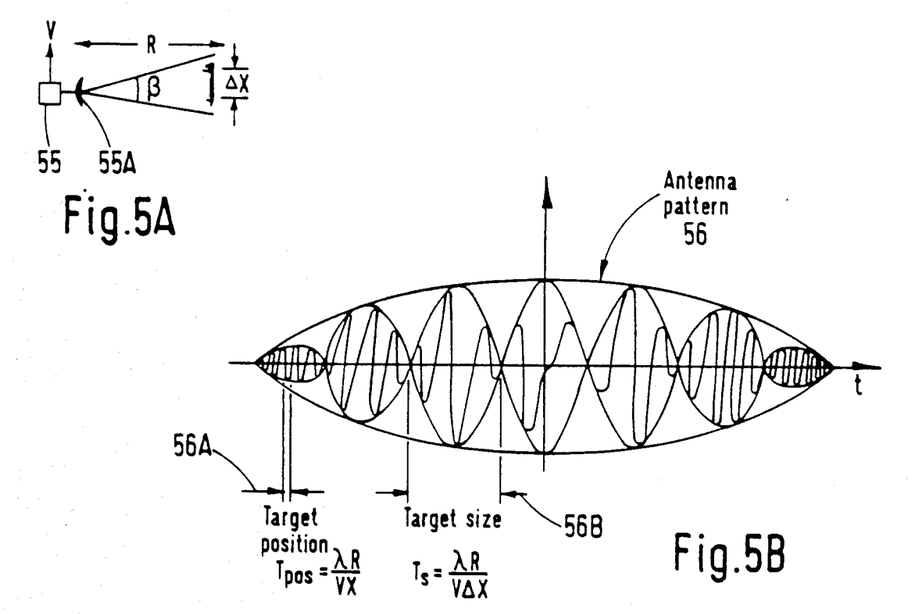
FIGS. 5A and 5B show an interferogram (interference pattern) when employing multifrequency waves, for illustrating specific functions.

Another and equivalent presentation which explains the same as FIG. 4, but from a different point of view is shown in FIGS. 5A and 5B. The situation according to FIG. 5A corresponds in the principle to the one in FIG. 4 in that a platform 55 with antenna 55A is moving at a velocity v, whereas an object represented by two points at a mutual distance $\Delta x$ located at a distance R from the platform 55, is illuminated by the antenna 55A thereof. Between the antenna and the object there will be standing an interferogram as shown in FIG. 5B, wherein curve 56 indicates the antenna pattern (interferogram) as a whole, whereas for example sections 56A and 56B show the position and the size respectively of the object, obtained as a result of the previously described multi frequency illumination.

By putting together wave number information provided according to FIGS. 4 and 5 it will be possible to improve the detection in a radar system, for example for discriminating between vessels and waves. The presentation then takes place by means of a diagram as shown in the principle in FIG. 2D and generally discussed above. More detailed an example of such a diagram is shown FIG. 6. Along both coordinates in the diagram there is a frequency separation scale and there is plotted a K-space signature for a ship at 61 and for the sea at 62 respectively. The signature 61 as shown has been calculated theoretically, whereas the sea signature 62 has been measured.

Figure 6:
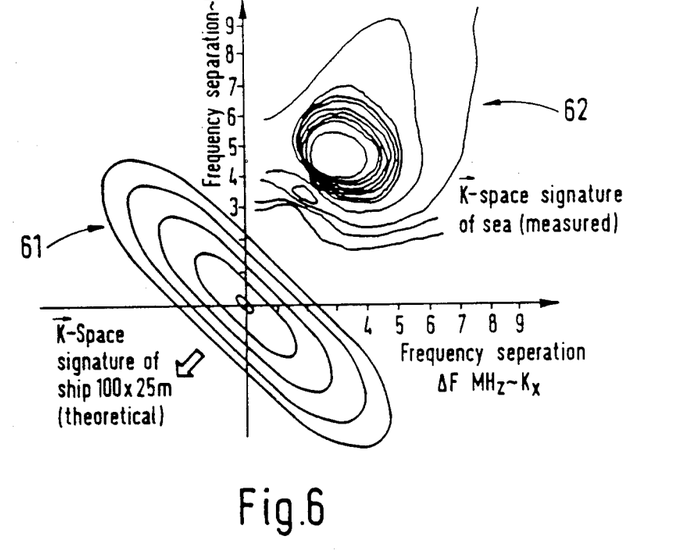
FIG. 6 shows in a diagram the socalled K-space-signature of a seasurface and a ship respectively.

Wave number plotting in a diagram as in FIG. 6 thus generally can be used for representing a scene including objects/background by establishing a harmonic hologram (interferogram, interference pattern) as explained previously. Quite generally by using complicated hologram patterns with respect to time variation, frequency components and aperture arrangement as mentioned above, it is moreover possible to adapt the system for scenes (objects and backgrounds) of the most differing types, but still describe the response in a diagram of the kind shown in FIG. 6 (and FIG. 2D). All the previously discussed filter functions may be of interest in this connection. On the basis of what is described here with reference to FIGS. 4, 5 and 6, the signal processing at the receiver side by wave number filtering may in other words give a registration of the response of a number of simultaneous interference patterns formed by transmitting waves towards an object, and determination of the degree of correspondence between the interference patterns and the object to be detected.

Figure 7:
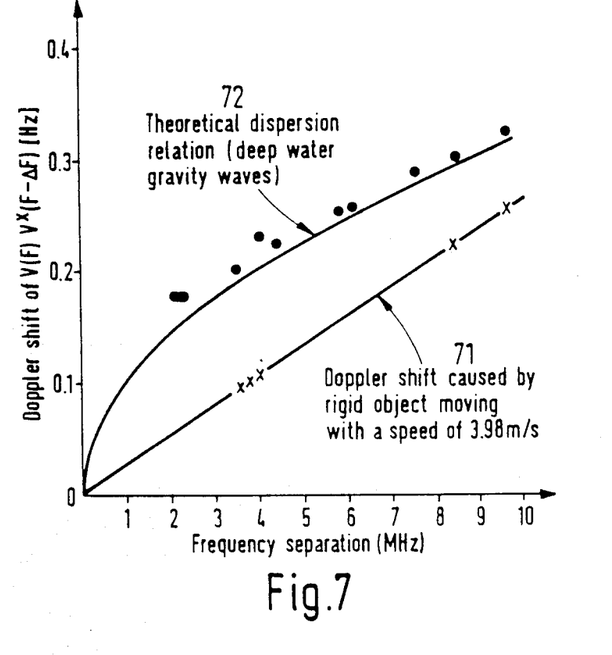
FIG. 7 is a diagram showing Doppler shift as a function of the frequency separation between multifrequency components used in a radar system.

FIG. 7 is a diagram obtained by subjecting a point sample from FIG. 6 to a time analysis by Doppler-processing (see FIGS. 1 and 2). Such processing and presentation is explained in the above references (6), (7) and (8). The diagram of FIG. 7 shows Doppler-shift as a function of frequency separation and two curves relating respectively to a rigid object in movement (curve 71) and to gravitational waves on water (curve 72). The latter curve is based upon the theoretical dispersion relation for gravitational waves on deep water.

As it appears from curves 71 and 72 in FIG. 7 the wave number Doppler-spectra for a vessel (rigid object) and a seasurface with waves, can only have a co-incident maximum spectral maximum for one value of the frequency separation $\Delta F$. For other values of $\Delta F$ therefore this form of filter function will result in a further enhanced contrast between sea and vessel, over and beyond that which is obtained with the remaining filter functions described.

This Doppler-filtering of the wave number spectrum with a calculation of the Doppler-spectrum of the non-averaged autocorrelation function $R(\Delta F)$ gives information as to how different structures which resonate with the frequency separation concerned, are moving. The Doppler-spectrum is calculated as $$P_{\Delta F}(f) = \frac{E_{f_i}(t)E_{f_j}^*(t)\exp(j2\pi ft)}{T}, f_i - f_j = \Delta F$$

Accordingly such Doppler-processing makes possible the determination of the movements of the object with respect to the interference pattern (hologram, interferogram) established.

More specifically the Doppler-curve 72 for the sea has a square law shape, whereas the vesel curve 71 is linear with an angular coefficient which is proportional to the radial velocity of the vessel (in relation to the observation platform). The one possible coinciding value mentioned, is given by intersection point between curves 71 and 72, lying at the right outside the diagram of FIG. 7.

Figure 8:
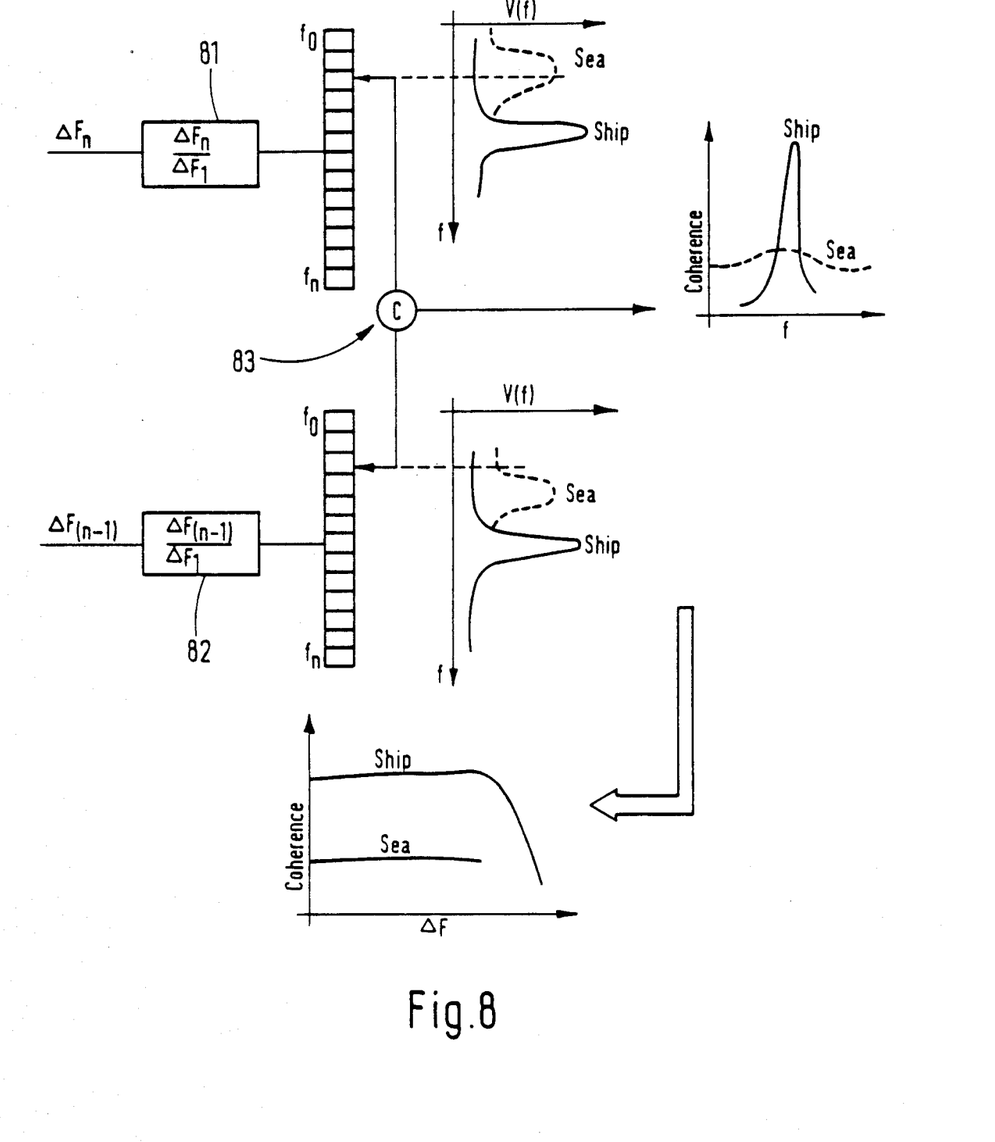
FIG. 8 illustrates schematically an advantageous Doppler signal treatment in the system according to the invention.

As the last functional block in front of the display block 15 in FIG. 1 there is shown a particular filter function designated mutual coherency, i.e. by filtering wave number series. This is implemented for example as illustrated in FIG. 8. Also here there is taken as an interesting use a rigid object, such as a vessel against a background in the form of the sea surface.

After deconvolution and normalization processes the time axis of the autocorrelation functions $R(\Delta F, t)$ is stretched (at 81 and 82 respectively) so that the differencies in $\Delta F$ are eliminated. This is effected by stretching the time axis with a factor $\Delta F_r/\Delta F_i$, whereby $\Delta F_i$ is the frequency difference of the R-function and $\Delta F_n$ is the reference frequency difference.

Then each of the frequency components in the normalized functions $R(\Delta F_i, t)$ and $R(\Delta F_n, t)$ are correlated (at 83). Because the seasurface is dispersive and compressible it will not give any correlation, whereas in contrast rigid objects such as vessels will give a significant correlation.

Instead of being with respect to the time access the stretching described can possibly be applied to the frequency axis, which is in full analogy. At this point the invention generally implies that the received and processed, complex Doppler-signal components resulting from the multi frequency waves transmitted, are treated in pairs by stretching of the time axis or the frequency axis of the highest frequency component in each pair and/or compressing of the time axis or the frequency axis for the lowest frequency component in the pair, in order to bring these components to the same frequency. This stretching and/or compressing is carried out with a factor being dependent upon what is to be detected. After this pair processing the two signal components are correlated so that there is obtained an improved detection of objects.

In the case of detection of underwater objects in movement generating internal waves in a water mass with consequent modification of a surface wave pattern on the water, the above stretching and/or compressing of the time axis or the frequency axis is carried out with a factor given by the dispersion relation for internal waves at the density profile concerned in the water mass.

The presently discussed mutual-coherency-function obtained by correlating normalized Doppler-spectra from one difference-frequency-pair with another, makes it possible to obtain an indication of the rigidity of the object or the structure being of interest.

When installing a system according to the invention on a platform intended for movement, for example an aircraft, a satelite or a ship, this platform can advantageously and in a manner known per se, be provided with an inertial reference device for stabilizing the antenna or the antennas (apertures) being included in the system. It will be realized that in the case of movable platforms, in particular when the two or more co-operating apertures which shall have a determined spacing, are divided between several such platforms, special precautions must be taken in order to compensate for possible mutual movements. Advantageously this can be obtained by means of a compensation device based upon phase shift of signals involved, for establishing a local and time limited stationary interference pattern of the waves. Such a solution will make possible, inter alia, particular arrangements in which at least two apertures are located each on a separate platform which is mechanically independent of each other, for example two airplanes.

Figure 9:
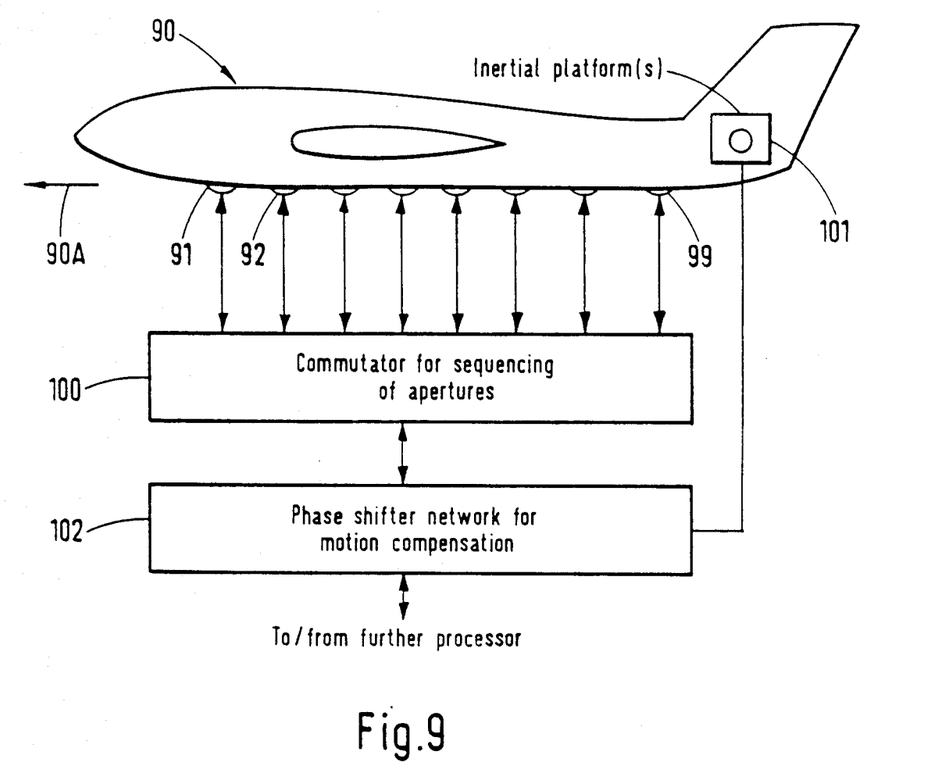
FIG. 9 shows a further particular embodiment according to the invention.

For a closer explanation of the possibilities just mentioned, reference is made to FIG. 9. This shows an aircraft 90 provided with a number of antennas 91–99 the main beam direction 90A of which may be parallel to the longitudional axis of the aircraft. With the location schematically shown the antennas have a mutual displacement in the main beam direction. Normally only a smaller number of these antennas 91–99, in particular the pairs thereof, will be used for simultaneous, coherent transmission and reception respectively. By means of a commutator 100 there may be effected an electronic switching between the antennas, so that among other things there can be obtained a time variation of the mutual distance between those antennas being activated at any given time. Moreover in FIG. 9 there is shown schematically an inertial reference device 101 which through a compensation device 102 based upon phase shift of the antenna signals, makes it possible to establish a desired interference pattern, in particular a local and time limited stationary interference pattern.

Finally experts in the field will understand that in such systems there is in the principle a complete reciprocity between the transmitter side and the receiver side. In substance therefore, features which have been discussed in the above description with reference to either the transmitter side or to the receiver side, will apply correspondingly to the other or complementary side, i.e. the receiver side and the transmitter side respectively.

We claim:

1. A system for the detection of objects with given, known characteristics against a background, comprising a transmitter means for transmitting one of either electromagnetic or acoustic waves having characteristics adapted for the objects to be detected or correspondingly adapted to suppress the background prior to the detection of the objects, said waves being composed of a number of coherent frequency components whose frequency is a function of time, and a receiver means for receiving backscattered electromagnetic or acoustic waves and for coherent demodulation using signal adaptive filters and comprising more than one homodyne detector, wherein at least one of said transmitter means and said receiver means comprise at least two apertures for coherent transmission or reception of the waves and wherein a distance between said at least two apertures is larger than one wavelength of the transmitted waves, and wherein signals derived from the received waves by said demodulation and filtering, and related to at least two simultaneously transmitted frequencies and at least two apertures respectively, undergo complex multiplication, wherein a signal detected by one of said more than one homodyne detectors at one frequency and at one of said at least two apertures, is subjected to said complex multiplication with another signal detected by another of said more than one homodyne detectors at another simultaneously transmitted frequency at another of said at least two apertures separated from said one aperture by at least one wavelength of said waves, said complex multiplication providing a product which constitutes a matched filter for a given object or background.

2. A system according to claim 1, wherein at least one of said transmitter means and said receiver means are adapted to supply or receive signals from said at least two apertures having the same frequencies.

3. A system according to claim 1, wherein at least one of said transmitter means and said receiver means are adapted to supply or receive signals from said at least two apertures having different frequencies.

4. A system according to claim 1, wherein at least one of said transmitter means and said receiver means are adapted to supply or receive signals from said at least two apertures having frequencies which vary with time.

5. A system according to claim 1, wherein each of said at least two apertures is adapted for directional radiation with a main beam direction, and that the main beam directions of said at least two apertures are mutually parallel and directed in the same sense.

6. A system according to claim 5, wherein said at least two apertures are located in the same plane which is normal to the main beam direction.

7. A system according to claim 5, wherein said at least two apertures are located with a mutual displacement in the main beam direction.

8. A system according to claim 1, wherein said distance between said at least two apertures is adapted to be varied as a function of time.

9. A system according to claim 1, wherein two of said at least two apertures are mounted each on a separate platform which is mechanically independent of other platforms.

10. A system according to claim 1, wherein at least one of said at least two apertures is mounted on a platform adapted to be moved, said platform being provided with inertial reference means for stabilizing said at least one aperture.

11. A system according to claim 9, wherein a compensating means is provided for the movement of the platform, based upon a phase shift of signals, for establishing a local and time limited stationary interference pattern of waves.

12. A system according to claim 1, wherein means are provided for the recording of the response of a number of simultaneous interference patterns which are formed by the transmission of waves against an object, and for a determination of the degree of correspondence between the interference patterns and the object to be detected.

13. A system according to claim 1, wherein a signal processing means is provided in said receiver means, and said processing means comprises Doppler-processing for determining the movements of an object in relation to interference pattern formed by the transmission of waves against an object.

14. A system according to claim 1, wherein signal adapted filters means are provided in said receiver means for generating a Doppler-signal for each multi-frequency component of the waves transmitted, and wherein the generated Doppler-signals are normalized with respect to power in order to form a normalized, complex Doppler-signal for each multifrequency component, and wherein these Doppler-signal components are processed in pairs by stretching of one of the time axis or the frequency axis for the highest frequency component in each pair and/or compressing of the time axis of the frequency axis for the lowest frequency component in the pair, for bringing these components to the same frequency, said stretching and/or compressing being effected with a factor which depends upon what is to be detected, and wherein the two signal components in each pair after said processing of pairs, are correlated so that there is obtained an improved detection of objects.

15. A system according to claim 14, for the detection of underwater objects whose movement generate internal waves in a water mass with resulting modification of a surface wave pattern on the water, wherein said stretching and/or compressing of the time axis or the frequency axis is effected with a factor given by the dispersion relation for internal waves at the density profile concerned in said water mass.

* * * * *